United States Patent
Bedekar

(10) Patent No.: US 11,075,797 B2
(45) Date of Patent: Jul. 27, 2021

(54) INTERFACE FOR A CLOUD RADIO ACCESS NETWORK

(71) Applicant: NOKIA TECHNOLOGIES OY, Espoo (FI)

(72) Inventor: Anand Bedekar, Glenview, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/487,620

(22) PCT Filed: Aug. 22, 2017

(86) PCT No.: PCT/IB2017/001190
§ 371 (c)(1),
(2) Date: Aug. 21, 2019

(87) PCT Pub. No.: WO2018/154348
PCT Pub. Date: Aug. 30, 2018

(65) Prior Publication Data
US 2020/0067765 A1  Feb. 27, 2020

Related U.S. Application Data

(63) Continuation of application No. 15/439,384, filed on Feb. 22, 2017.

(51) Int. Cl.
*G06F 15/16* (2006.01)
*G06F 9/54* (2006.01)
(Continued)

(52) U.S. Cl.
CPC .......... *H04L 41/0803* (2013.01); *H04L 47/80* (2013.01); *H04W 76/10* (2018.02); *H04W 92/14* (2013.01)

(58) Field of Classification Search
CPC .................................................... H04W 76/15
(Continued)

(56) References Cited

U.S. PATENT DOCUMENTS

2009/0046599 A1* 2/2009 Pollakowski ....... H04L 41/0806
370/254
2009/0252132 A1* 10/2009 Song ..................... H04W 76/15
370/338
(Continued)

FOREIGN PATENT DOCUMENTS

EP  2 512 202 A1  10/2012

OTHER PUBLICATIONS

International Search Report and Written Opinion dated Jan. 24, 2018 corresponding to International Patent Application No. PCT/IB2017/001190.
(Continued)

*Primary Examiner* — Hamza N Algibhah
(74) *Attorney, Agent, or Firm* — Squire Patton Boggs (US) LLP

(57) ABSTRACT

Various communication systems may benefit from improved communications in a cloud radio access network. A method, in certain embodiments, may include receiving, at a network node frontend, which supports at least one of a first cell identification or a first base station identification, an indication that at least one of a second cell identification or a second base station identification is supported by a plurality of other network node frontends. The method may also establishing multiple connections between the network node frontend and the plurality of other network node frontends in which at least one of the second cell identification or the second base station identification is supported. In addition, the method may include transmitting a message related to the second cell identification or the second base station
(Continued)

identification using any one of the multiple connections between the network node frontend and the plurality of other network node frontends.

21 Claims, 10 Drawing Sheets

(51) Int. Cl.
*H04L 29/06* (2006.01)
*H04L 12/24* (2006.01)
*H04L 12/927* (2013.01)
*H04W 76/10* (2018.01)
*H04W 92/14* (2009.01)

(58) Field of Classification Search
USPC ........................................................ 709/220
See application file for complete search history.

(56) References Cited

U.S. PATENT DOCUMENTS

| | | | |
|---|---|---|---|
| 2013/0178210 A1* | 7/2013 | Wang | H04W 36/0011 |
| | | | 455/436 |
| 2014/0219248 A1* | 8/2014 | Reddiboyana | H04W 76/15 |
| | | | 370/331 |
| 2015/0312841 A1* | 10/2015 | Sirotkin | H04W 40/246 |
| | | | 370/254 |
| 2016/0119037 A1* | 4/2016 | Won | H04B 7/0619 |
| | | | 370/328 |
| 2016/0262069 A1* | 9/2016 | Parsay | H04W 36/165 |
| 2016/0330748 A1* | 11/2016 | Bindrim | H04L 65/1013 |
| 2017/0265133 A1* | 9/2017 | Chandramouli | H04W 52/0241 |
| 2018/0352593 A1* | 12/2018 | Velev | H04W 76/12 |

OTHER PUBLICATIONS

3GPP TR 38.801 V1.1.0 (Jan. 2017), Technical Report, 3rd Generation Partnership Project; Technical Specification Group Radio Access Network; Study on New Radio Access Technology; Radio Access Architecture and Interfaces (Release 14), Feb. 15, 2017, XP051225961.

China Telecom et al: "Motivation for New Study Item on Flexible eNB-ID and Cell-ID in E-UTRAN," 3GPP Draft; RP-160053, 3GPP TSG RAN Meeting #71, Goteborg, Sweden, Mar. 7-10, 2016, Mar. 6, 2016, XP051076049.

Communication pursuant to Article 94(3) EPC dated Oct. 27, 2020 corresponding to European Patent Application No. 17797177.7.

* cited by examiner

INTERFACE FOR A CLOUD RADIO ACCESS NETWORK

CROSS REFERENCE TO RELATED APPLICATION

This application claims priority to U.S. patent application Ser. No. 15/439,384 filed on Feb. 22, 2017. The entire content of the above-referenced application is hereby incorporated by reference.

BACKGROUND

Field

Various communication systems may benefit from improved communications in a cloud radio access network. For example, certain communication systems may benefit from an improved X2 or Xn interface that connects two or more frontends in the cloud radio access network.

Description of the Related Art

In Third Generation Partnership Project (3GPP) technology, such as Long Term Evolution (LTE) or LTE Advanced (LTE-A), an X2 interface is used for communication between two or more network nodes, such as two or more evolved NodeBs (eNBs). In 5' generation (5G) or New Radio (NR) 3GPP technology, an Xn interface may be used to connect between two network nodes, instead of an X2 interface. Specifically, an Xn interface may allow for interconnecting between two or more 5G network nodes (gNB) or between one gNB and another base station of a different 3GPP technology, such as an LTE eNB. Xn may also be used to connect between two LTE release-15 network nodes, also known as eLTE, eNBs.

In LTE, the X2 interface may be used for both user equipment (UE) based messaging, for example a handover, or non-UE associated messaging, for example load-information or resource status reporting between eNBs. The load of the UE-associated messaging may scale with the number of users, meaning that the more UEs are handled by a base station the higher the load will be for UE-associated messaging. Non-UE associated messaging, on the other hand, scales with the number of cells, as opposed to the number of UEs.

In current cloud Radio Access Network (RAN) design, a collection of processing instances, such as virtual machines or containers, perform upper (non-real-time) layer functioning. For any given cell identification or base station identification, a particular instance may be designated to handle the X2 termination. In other words, because in a cloud environment a single network entity cannot be identified as a base station, virtual machines by may be used to communicate with the X2 interface for a given cell or base station identification. This part of the particular cloud instance may be termed an XFE, referring to either an X2-frontend instance in LTE technology or an Xn-frontend instance in 5G technology.

Cells or base stations may be mapped to a particular instance for X2 processing. The mapping or assigning typically occurs at a time the cell or base station are brought up or initiated. When the number of users in the cell or base station identifications whose X2 or Xn is served by a particular XFE grows, then the signaling load on the XFE may also grow, thereby causing a potential overload. In a 5G environment, the anticipated density of the cells will be higher, due to the use of a higher spectrum. The Xn interface will therefore have to handle an even greater load, with higher swings, burstiness, and peak signaling loads, and the signaling load on an XFE would be correspondingly greater.

SUMMARY

According to certain embodiments, an apparatus may include at least one memory including computer program code, and at least one processor. The at least one memory and the computer program code may be configured, with the at least one processor, to cause the apparatus at least to receive, at a network node frontend, which supports at least one of a first cell identification or a first base station identification, an indication that at least one of a second cell identification or a second base station identification is supported by a plurality of other network node frontends. The at least one memory and the computer program code may also be configured, with the at least one processor, to cause the apparatus at least to establish multiple connections between the network node frontend, which supports at least one of a first cell identification or a first base station identification, and the plurality of other network node frontends in which at least one of the second cell identification or the second base station identification is supported. In addition, the at least one memory and the computer program code may be configured, with the at least one processor, to cause the apparatus at least to transmit a message related to the second cell identification or the second base station identification using any one of the multiple connections between the network node frontend and the plurality of other network node frontends.

A method, in certain embodiments, may include receiving, at a network node frontend, which supports at least one of a first cell identification or a first base station identification, an indication that at least one of a second cell identification or a second base station identification is supported by a plurality of other network node frontends. The method may also include establishing multiple connections between the network node frontend, which supports at least one of a first cell identification or a first base station identification, and the plurality of other network node frontends in which at least one of the second cell identification or the second base station identification is supported. In addition, the method may include transmitting a message related to the second cell identification or the second base station identification using any one of the multiple connections between the network node frontend and the plurality of other network node frontends.

An apparatus, in certain embodiments, may include means for receiving, at a network node frontend, which supports at least one of a first cell identification or a first base station identification, an indication that at least one of a second cell identification or a second base station identification is supported by a plurality of other network node frontends. The apparatus may also include means for establishing multiple connections between the network node frontend, which supports at least one of a first cell identification or a first base station identification, and the plurality of other network node frontends in which at least one of the second cell identification or the second base station identification is supported. In addition, the method may include means for transmitting a message related to the second cell identification or the second base station identification using any one of the multiple connections between the network node frontend and the plurality of other network node frontends.

According to certain embodiments, a non-transitory computer-readable medium encoding instructions that, when executed in hardware, perform a process. The process may include receiving, at a network node frontend, which supports at least one of a first cell identification or a first base station identification, an indication that at least one of a second cell identification or a second base station identification is supported by a plurality of other network node frontends. The process may also include establishing multiple connections between the network node frontend, which supports at least one of a first cell identification or a first base station identification, and the plurality of other network node frontends in which at least one of the second cell identification or the second base station identification is supported. In addition, the process may include transmitting a message related to the second cell identification or the second base station identification using any one of the multiple connections between the network node frontend and the plurality of other network node frontends.

According to certain other embodiments, a computer program product may encode instructions for performing a process. The process may include receiving, at a network node frontend, which supports at least one of a first cell identification or a first base station identification, an indication that at least one of a second cell identification or a second base station identification is supported by a plurality of other network node frontends. The process may also include establishing multiple connections between the network node frontend, which supports at least one of a first cell identification or a first base station identification, and the plurality of other network node frontends in which at least one of the second cell identification or the second base station identification is supported. In addition, the process may include transmitting a message related to the second cell identification or the second base station identification using any one of the multiple connections between the network node frontend and the plurality of other network node frontends.

According to certain embodiments, an apparatus may include at least one memory including computer program code, and at least one processor. The at least one memory and the computer program code may be configured, with the at least one processor, to cause the apparatus at least to establish multiple connections between a network node frontend, which supports at least one of a first cellular identification or a first base station, and a plurality of other network node frontends in which a second cell identification or a second base station identification is supported. The at least one memory and the computer program code may also be configured, with the at least one processor, to cause the apparatus at least to receive a message related to the second cell identification or the second base station identification using any one of the multiple connections between the network node frontend and the plurality of other network node frontends.

A method, in certain embodiments, may include establishing multiple connections between a network node frontend, which supports at least one of a first cellular identification or a first base station, and a plurality of other network node frontends in which a second cell identification or a second base station identification is supported. The method also include receiving a message related to the second cell identification or the second base station identification using any one of the multiple connections between the network node frontend and the plurality of other network node frontends.

An apparatus, in certain embodiments, may include means for establishing multiple connections between a network node frontend, which supports at least one of a first cellular identification or a first base station, and a plurality of other network node frontends in which a second cell identification or a second base station identification is supported. The apparatus also include means for receiving a message related to the second cell identification or the second base station identification using any one of the multiple connections between the network node frontend and the plurality of other network node frontends.

According to certain embodiments, a non-transitory computer-readable medium encoding instructions that, when executed in hardware, perform a process. The process may include establishing multiple connections between a network node frontend, which supports at least one of a first cellular identification or a first base station, and a plurality of other network node frontends in which a second cell identification or a second base station identification is supported. The process may also include receiving a message related to the second cell identification or the second base station identification using any one of the multiple connections between the network node frontend and the plurality of other network node frontends.

According to certain other embodiments, a computer program product may encode instructions for performing a process. The process may include establishing multiple connections between a network node frontend, which supports at least one of a first cellular identification or a first base station, and a plurality of other network node frontends in which a second cell identification or a second base station identification is supported. The process may also include receiving a message related to the second cell identification or the second base station identification using any one of the multiple connections between the network node frontend and the plurality of other network node frontends.

BRIEF DESCRIPTION OF THE DRAWINGS

For proper understanding of the invention, reference should be made to the accompanying drawings, wherein.

DETAILED DESCRIPTION

Figure 1:
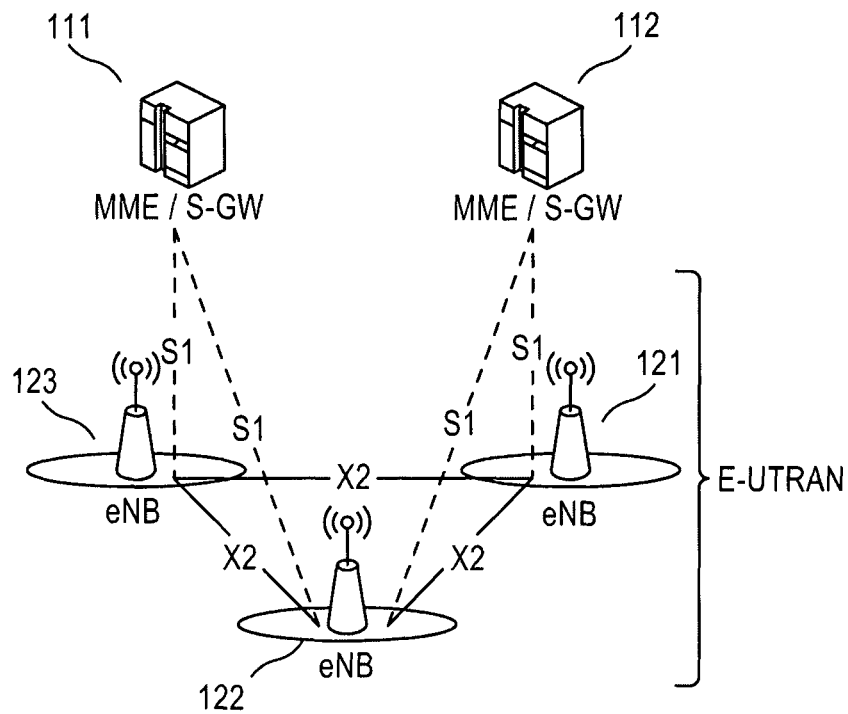
FIG. 1 illustrates an LTE network architecture.

Certain embodiments may help to prevent the X2 or Xn interface in a cloud environment from becoming a bottleneck in an otherwise efficient network. When the numbers of users in the cell or base station identification whose X2/Xn is served by a particular XFE, such as an XFE1, grows then the signaling load on that XFE would also grow, causing potential overload in XFE1. If there were another XFE, such as XFE2, with extra bandwidth or spare processing availability, it might be beneficial to offload some portion of the signaling load from XFE1 to XFE2. The current X2 interface structure, however, may not allow such offloading because from any cell/eNB's perspective, all the signaling within a given neighboring cell or eNB may only be transmitted through a single X2 connection. While the X2 connection may be torn down and re-established through another XFE, this re-establishment involves significant latency.

In certain embodiments, therefore, the Xn logical interface between a given pair of base stations or network nodes, such as gNBs or eLTE, may include one or more connections between one or more entities, at each logical end. In other words, at each end of the Xn interface, there may be a pool of XFE entities with M:N connections, between a pool of M XFE entities on one side and NXFE entities on the other side. The frontends associated with each cell ID or network node ID may map back to a common set of radio access points, network nodes, or cells. Some embodiments may therefore establish multiple connections between the network node frontend, referred to as a XFE1, and a plurality of other network node frontends, referred to as a XFE2. The network node frontend may support at least one of a first cell identification or a first base station identification, and the plurality of other network node frontends may support a second cell identification or a second base station identification. Although the embodiments described below are related to an Xn interface in 5G, certain other embodiments may be applicable to X2 interface in LTE or any other 3 GPP interface.

Any of the multiple connections, which may be Xn connections, may be capable of carrying the Xn signaling, related to the second cell identification or the second base station identification, between the network node frontend and the plurality of other network node frontends. Alternatively, the multiple connections may be between cells or eLTE eNBs. In such an embodiment, the signaling load of the Xn interface may be distributed amongst the multiple connections. Whenever one side of the interface experiences overload, a new XFE entity may be added into the plurality of other network node frontends, and a new connection within the multiple connections may be established. Such an embodiment may allow for the graceful scaling of Xn, while preventing the Xn from becoming a bottleneck.

From the perspective of a first gNB, including the network node frontend, there is a pool of XFEs, any of which may carry out the Xn signaling related to the base station identification of the first gNB or the cell identification of the cell associated with the first gNB. From the perspective of a second gNB which is a neighbor of the first gNB, and which may have a different base station identification or cell identification, multiple connections may carry out the Xn signaling between the pair of base station identifications or cell identifications of the first and second gNBs. The multiple connections may be originated or terminated at more than one XFE.

In certain other embodiments, from a given XFE1, which supports a first gNB or cell identification, to a plurality of peer entities referred to as XFE2, and which support a second gNB or cell identification, there may be one or more connections. Any one of the multiple connections may carry the Xn signaling between XFE1 and XFE2. For any given one of the multiple connections between XFE1 and XFE2, each XFE may, for example, announce which cell, network node, or base station identification the given frontend may handle for Xn signaling perspective. The announcement may, in some embodiments, utilize a network entity, for example, a mobility management entity (MME), to announce the cell, network node, or base station identification.

To establish an Xn connection towards a given target eNB identification or a cell identification, a given XFE may discover which available peer XFEs can support the target eNB identification or cell identification. In other words, the network node frontend may receive an indication that at least one of a cell identification or a base station identification is supported by a plurality of other network node frontends. In certain embodiments, establishing the multiple connections may utilize an extension of the self-organizing network (SON) automatic neighbor relation (ANR) procedure. When initiating a particular procedure, such as a handover, from a given source gNB/cell towards a given target gNB/cell, the frontend of the source gNB/cell may choose any one of the Xn connections on which the peer XFE has announced support for which the given target gNB/cell, for example in a load-balancing manner.

An extension of the SON ANR procedure, for example, may include transmitting a request to a network entity, for example an MME, including an indication, which may be referred to as another indication, of a target cell or base station that corresponds to the second cell identification or the second base station identification. The extended SON ANR procedure may allow a network node frontend to receive the indication from the network entity including information about at least one of the plurality of other network node frontends that support the second cell identification or the second base station identification. At least one of the multiple connections to at least one of the plurality of other network node frontends may then be established using the information received from the network entity. A similar SON ANR procedure may also be performed by at least one of the plurality of other network node frontends, which may also receive an indication from the network entity.

FIG. 1 illustrates an LTE system according to certain embodiments. As can be seen in FIG. 1, the LTE system may include eNB 121, eNB 122, and eNB 123. The eNBs may be connected to one another via an X2 interface. FIG. 1 also illustrates an S1 interface located between eNB 123 and MME or serving gateway (S-GW) 111, as well as an S1 interface between MME/S-GW 111 and eNB 122. Another S1 interface may also exist between eNB 121 and MME/S-GW 112, as well as between eNB 122 and MME/S-GW 112. As can be seen in FIG. 1, only a single X2 connection exists between each pair of eNBs.

Figure 2:
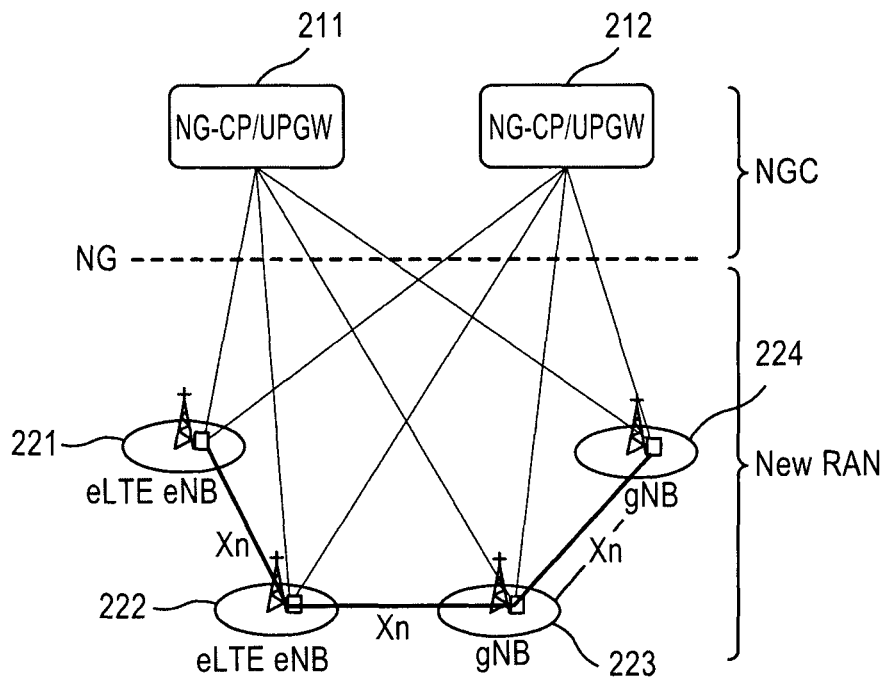
FIG. 2 illustrates a 5G network architecture.

FIG. 2 illustrates a 5G system according to certain embodiments. As can be seen in FIG. 2, the system includes a next generation core including a next generation core control plane or user plane gateway 212 and 211. The new RAN may also include base stations or network nodes, such as eLTE eNB 221, eLTE eNB 222, gNB 223, and gNB 224.

Each of the base stations and/or network nodes are connected to another one of the base stations and/or network nodes via a single Xn. As discussed above, a single Xn connection between the base stations and/or network nodes may lead to the Xn becoming a bottleneck.

Figure 3:
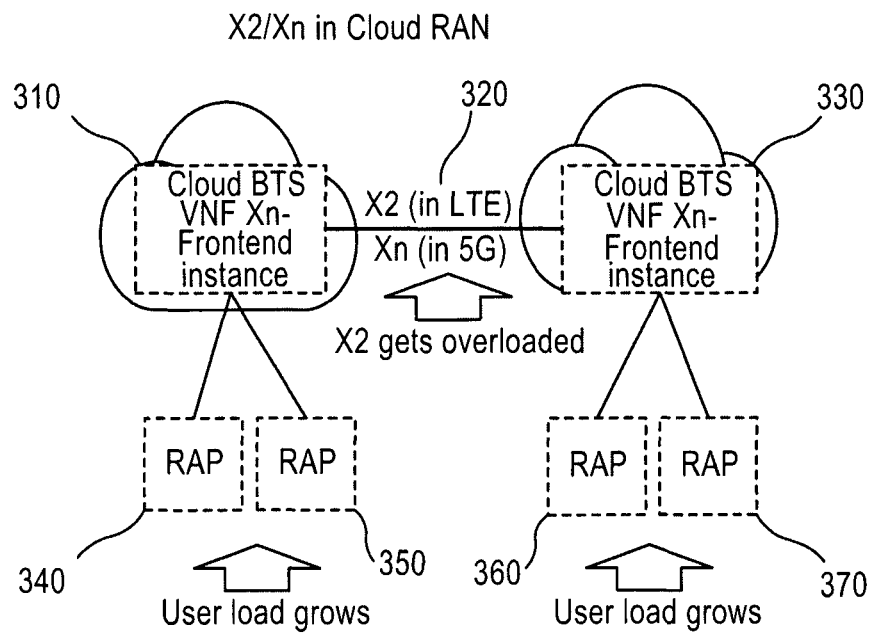
FIG. 3 illustrates an example of a system with a single X2/Xn connection according to certain embodiments.

FIG. 3 illustrates a system with a single X2/Xn connection. In particular, FIG. 3 illustrates an X2/Xn interface in a cloud RAN. As can be seen in FIG. 3, the system may include a first Xn frontend instance 310 located in a first cloud connected using an X2 interface in LTE or Xn interface in 5G to a second Xn frontend instance 330 located in a second cloud. A radio access points 340, 350 may be connected to frontend 310, while radio access points 360, 370 may be connected to frontend 320. In an embodiment in which the user load grows on the radio access points, the X2 or Xn interface may become overloaded, thereby preventing the proper transmittal of data between Xn frontend 310 and Xn frontend 330.

Figure 4:
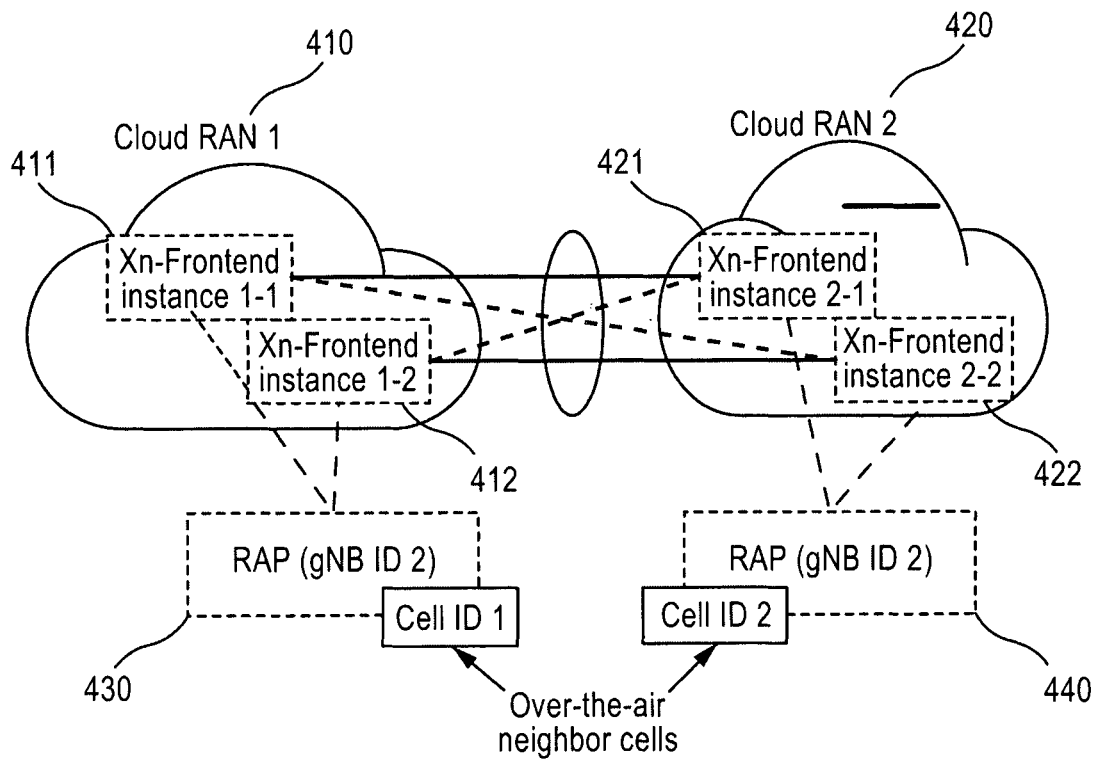
FIG. 4 illustrates an example of a system according to certain embodiments.

FIG. 4 illustrates a system according to certain embodiments. As can be seen in FIG. 4, the first cloud RAN 410 and the second cloud RAN 420 each include a plurality of frontend instances. First cloud RAN 410 includes frontend instances 411 and 412, while second cloud RAN includes frontend instances 421 and 422. Each of the frontend 411 and 412 may be capable of handling Xn signaling for gNB ID 1/Cell ID 1, while each of the frontend 421 and 422 may be capable of handling Xn signaling for gNB ID 2/cell ID 2. In other words, the network node frontend and the plurality of other network node frontends may be associated with a different cell identification or network node identification, and for a given gNB identifier or cell identifier, there may be multiple frontend instances capable of handling the signaling. Between the plurality of frontend instances in the cloud RAN, there may be multiple connections shown as solid and dashed lines. The Xn-related signaling between gNB ID 1/Cell ID 1 and gNB ID 2/Cell ID 2, whether user-associated or not user-associated, may be transmitted over any one of the multiple connections.

Figure 5:
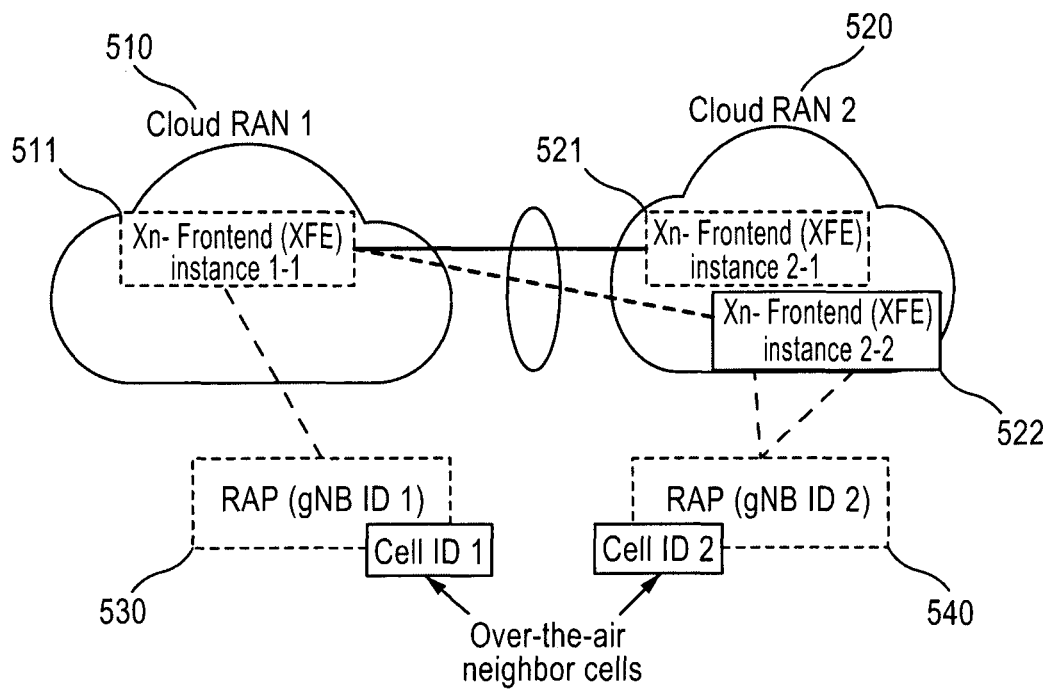
FIG. 5 illustrates an example of a system according to certain embodiments.

FIG. 5 illustrates a system according to certain embodiments. Specifically, FIG. 5 illustrates a system in which gNB ID 1/Cell ID 1 and gNB ID 2/Cell ID 2 are over-the-air neighbor cells. A first cloud RAN 510 which is associated with first radio access point 530, while a second RAN 520 is associated with second radio access point 540. First cloud RAN 510 includes one frontend instance 511 that may be configured for Xn signaling for gNB ID 1/Cell ID 1. Second cloud RAN 520 may include frontend instance 521. In certain embodiments, an Xn interface may be established between frontend instance 511 and frontend instance 521, and all Xn signaling between gNB ID 1/Cell ID 1, and gNB ID 2/Cell ID 2 may go over the Xn connection. In other words, frontend 511 may support gNB ID 1/cell ID 1, while the plurality of other frontends 521 and 522 may support gNB ID 2/cell ID 2.

In some embodiments, cloud RAN 2 may experience an overload condition and frontend instance 521 may become unavailable. Cloud RAN may then invoke a scaleout and create an additional frontend instance, such as Xn frontend instance 522. The new frontend instance 522 then establishes an additional Xn connection, shown as a dashed line, and announces that new frontend instance 522 may support Xn signaling for gNB ID 2/Cell ID 2. The announcement may be in the form of an indication received at the network node frontend. In certain embodiments, the additional Xn connection between frontend instance 511 and new frontend instance 522 may be established or bootstrapped using an extension of a SON ANR procedure.

Frontend instance 511 may now have a choice of Xn connections for signaling between gNB ID 1/Cell ID 1 and gNB ID 2/Cell ID 2 using either the Xn connection towards frontend 521 or the Xn connection towards frontend 522. When initiating any Xn procedure, frontend instance 511 can then select which of the Xn connections it should use. Frontend instance 511 should also be prepared that either frontend instance 521 or frontend instance 522 may initiate Xn signaling procedures for source gNB ID 2 or Cell ID 2.

Figure 6:
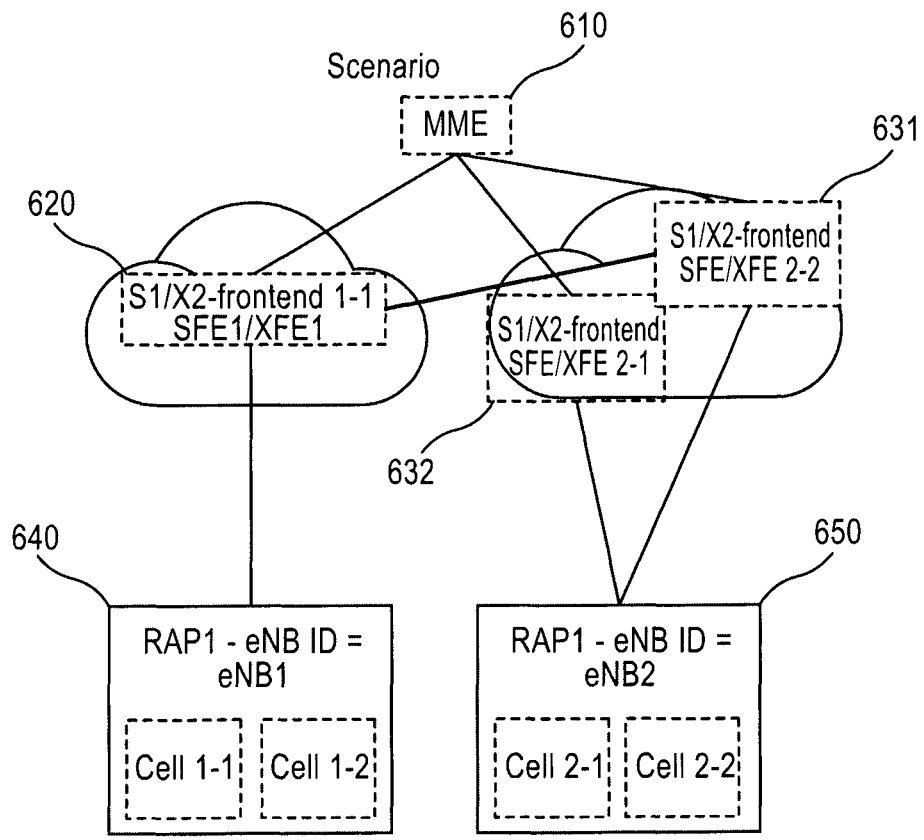
FIG. 6 illustrates an example of a system according to certain embodiments.

FIG. 6 illustrates a system according to certain embodiments. In particular, FIG. 6 illustrates an enhancement for SON ANR procedure for establishing an Xn connection. In certain embodiments, each network node frontend instance may be capable of serving as a frontend for an S1 interface as well. An S1 interface may be a connection between an MME and the network node frontend. In certain other embodiments, the network node frontend used for an S1 connection, and the network node frontend used for an X2 connection may be decoupled, meaning that there may each have their own separate network frontend. In 5G technology, instead of S1, the interface may be an N2. While the S1 interface is used in various embodiments discussed below, some other embodiments may utilize N2.

FIG. 6 illustrates a system according to certain embodiments. In particular, the system of FIG. 6 may include a first radio access point 640 and a second radio access point 650, associated with cell ID 1 and cell ID 2, respectively. In certain embodiments, the S1 frontend (SFE) may be configured to also be an Xn-frontend for at least a set of some of the one or more Cell IDs/eNB IDs. The system also includes an MME 610, connected to an S1/X2 frontend 620, S1/X2 frontend 631, and S1/X2 frontend 632. Frontend 620 may be located in a different cloud RAN than frontends 631 and 632. In other words, frontend 620 may support at least one of a first cell identification or a first base station identification, while the plurality of other frontends 631 and 632 may support at least one of a second cell identification or a second base station identification. When establishing the S1 setup with the MME, the SFE may provide the MME with the cell IDs/eNB IDs. In some other embodiments, the S1 frontend may indicate to the MME whether it is willing to serve as an Xn frontend for a cell-based and/or a user-based connection. As can be seen in FIG. 6, frontends 620, 631, and 630 have an S1 connection to MME, while frontends 620 and 631 also have an Xn connection.

Figure 7:
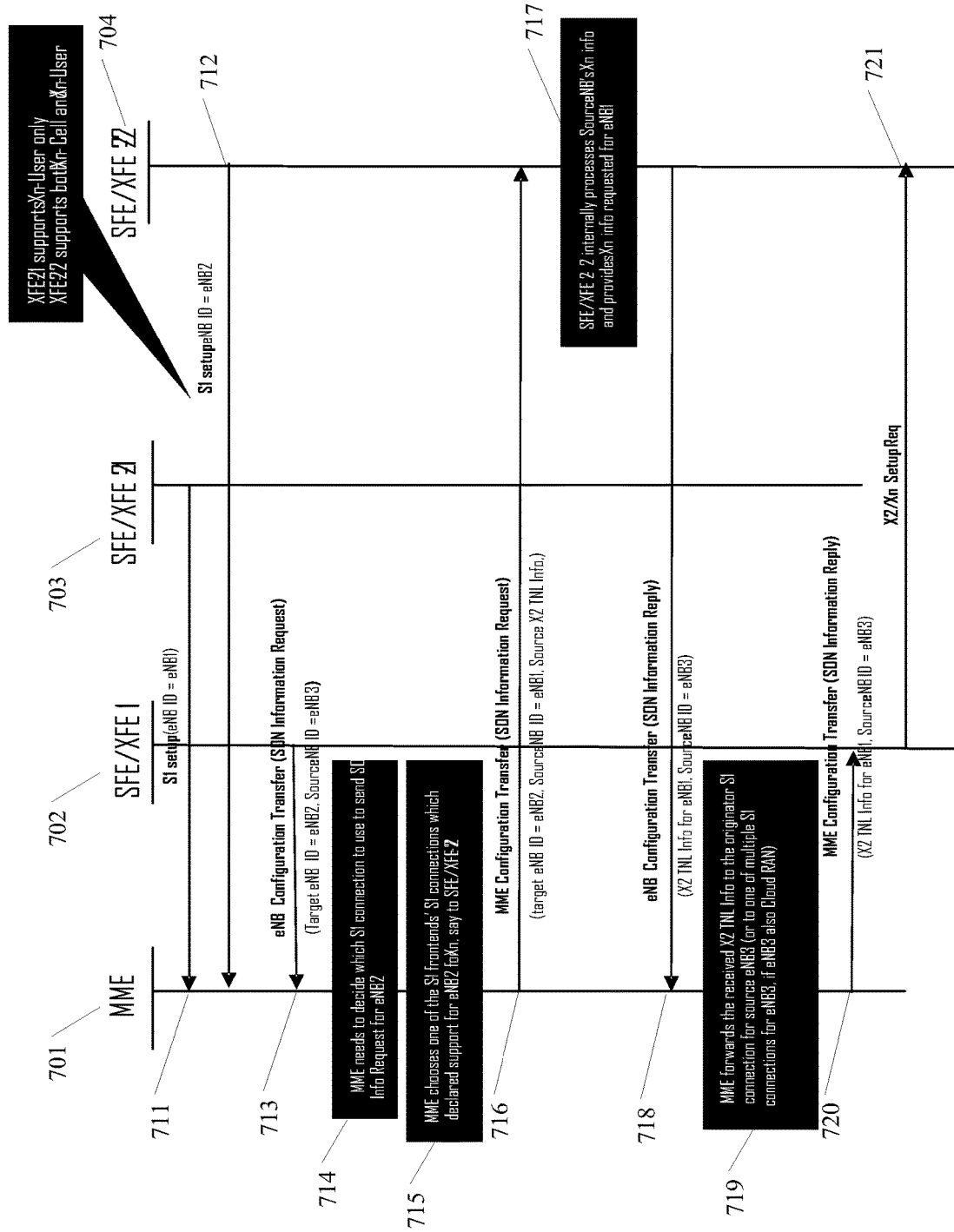
FIG. 7 illustrates an example of a signal flow diagram according to certain embodiments.

FIG. 7 illustrates a signal flow diagram according to certain embodiments. In particular, FIG. 7 illustrates that MME 701, SFE/XFE 702, SFE/XFE 703, and/or SFE/XFE704, which may correspond to MME 610, S1/Xn frontend 620, S1/Xn frontend 631, and/or S1/Xn frontend 632, respectively. In step 711, the MME may receive an S1 setup message from SFE/XFE 702, while in step 712 the MME may receive an S1 setup message from SFE/XFE 704. In other words, frontend 702 may announce to MME 701 that it is associated or supported with a first eNB ID or a first cell ID, while frontend 703 may announce to MME 701 that it is associated or supported with a second eNB ID or a second cell ID.

When an frontend for a give source Cell ID/eNB ID wants to initiate an Xn-cell or Xn-user connection, also known as a cell-based connection and a user-based connection, to a target Cell ID/eNB ID, in step 713, frontend 703 may send a configuration transfer message to the MME. The configuration transfer message may include at least an SON information request, such as the target eNB ID and the source eNB ID. In certain embodiments, frontend 703 may indicate that the MME should check with one or more S1 connections. This may allow the requesting S1 frontend to set up multiple Xn connections at the frontend for the same target cell ID/eNB ID.

In step 714, MME 701 decides which one or more of the S1 connections may be used to send the SON information request for eNB2. MME 701, in step 715, may then choose one or more of the S1 connections that advertised support for the provided target cell ID/eNB ID. In step 716, MME 701 may then send the MME or S1-eNB Configuration Transfer/SON Information Request to the chosen one or more S1 connections, which is frontend 704 in this case. The frontend 704 may then process the source eNB Xn information, and provide an Xn information request for eNB1, as shown in step 717. In step 718, frontend 704 receiving the request from MME 701 in step 716 may respond back with the IP address information that should be provided to the requester for Xn-Cell and/or Xn-user connection setup. The MME forwards the received X2 transport network layer (TNL) information to the originator S1 connection for source eNB3, or to one of multiple S1 connections for eNB3, if eNB3 is also a cloud RAN, as shown in step 719.

In step 720, MME 701 may send an MME configuration transfer/SON Information Reply to frontend 702. The MME configuration transfer reply may include an X2 TNL information for eNB 1, including the source eNB ID equal to eNB3. In step 721, the originating frontend, such as frontend 702, may initiate one or more Xn connection setup request based on the provided information. In some embodiments, the receiving frontend, in step 720, may redirect the Xn-cell or Xn-user connection setup request to another frontend. The redirecting of Xn setup request may be, for example, a result of load-balancing. If the recipient frontend is overloaded, the originating frontend can redirect the originating frontend to try another frontend. In another embodiments, the assignment of cells to the frontend may have changed, and the MME may not have been notified.

In certain embodiments, an Xn interface may be comprised of logically separate Xn-user and/or Xn-cell sub-interfaces. In other words, the multiple connections may be separated based on whether the connection is carrying user-associated/user-based signaling or non-user-associated signaling, referred to as cell-level/cell-based signaling. User-associated/used-based signaling may include procedures that involve a specific UE, such as handover of a UE. Non-user-associated/cell-based signaling may include procedures that typically carry information related to a whole cell rather than individual UEs, such as Load Information. The Xn interface between the network nodes may be locally composed of one or more Xn-cell connections and/or one or more Xn-user connections, which may terminate at different Xn frontend instances. Each of the different Xn frontend instance may have a different internet protocol address. Structurally, a single stream control transmission protocol (SCTP) connection may carry both the user-based connections and the cell-based connections. In some other embodiments, however, two different SCTP connections may be used for a user-based connection or a cell-based connection.

Figure 8:
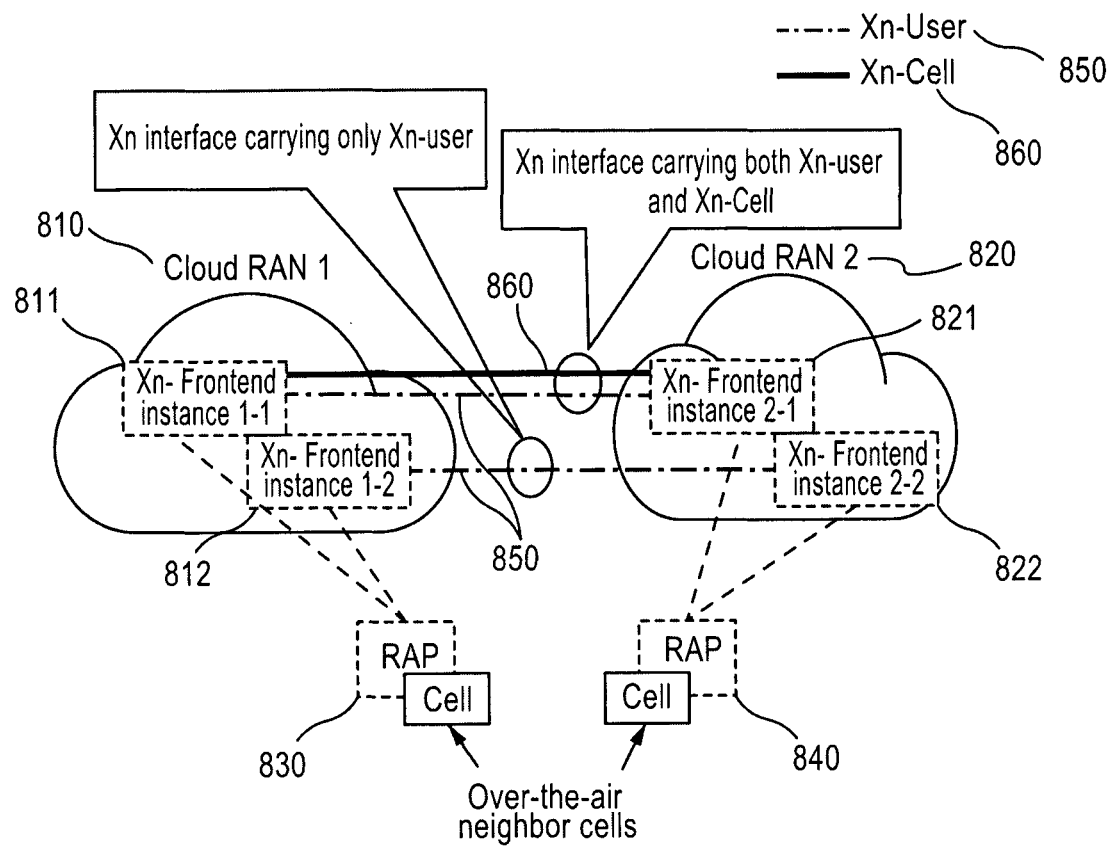
FIG. 8 illustrates an example of a system according to certain embodiments.

FIG. 8 illustrates a system according to certain embodiments. In particular, FIG. 8 illustrates multiple connections located between one or more frontends at a first cloud RAN 810 and one or more frontends at a second cloud RAN 820. The multiple connections may include connections or sub-connections that are separated into user-based connections 850 and cell-based connections 860. A first cloud RAN 810 may include Xn frontend instance 811 and an Xn frontend instance 812. The second cloud RAN 820 may include Xn frontend instance 821 and an Xn frontend instance 822. Cloud RAN 810 may be associated with first radio access points 830, while cloud RAN 820 may be associated with second radio access points 840. In other words, frontend 811 may support at least one of a first cell identification or a first base station identification, while the plurality of other frontends 821 and 822 may support at least one of a second cell identification or a second base station identification.

In certain embodiments, one or more frontend instances may terminate cell-based connections 860 for non-user associated signaling for that cell. One or more frontend instances, on the other hand, may terminate user-based connections 850 for user associated signaling for that cell. In the example of FIG. 8, a user-based connection 850 may be placed between frontend 812 and frontend 822, as well as frontend 811 and frontend 821. A cell-based connection may also be placed between frontend 811 and frontend 821.

For any given pair of cells, which may be over-the-air neighbor cells, there may be one or more Xn cell-based connection 860. The non-user equipment associated procedures may be transmitted between the pair of cells at any one of the Xn cell-based connections 860. For example, some resource-status updates may be transmitted over the Xn cell-based connection, while other resource-status updates may be transmitted over another Xn cell-based connection. In some embodiments, there may preferably only be a single cell-based connection.

In some embodiments, as shown in FIG. 8, there may be more than one user connection. The user-based procedures may be transmitted in any of the user-based connections. The procedures may be transmitted over multiple user-based connections at the same time. For example, some handovers may be transmitted over a first user-based connection, while some handovers may be transmitted over a second user-based connection. For any given cell-based connection and/or any given user-based connection, between a pair of frontends, each connection may server multiple cell IDS or eNB IDs. The list of cell IDs or eNB IDs for which non-user equipment associated procedures may be conducted may be negotiated. At the Xn connection setup, such as steps 711 and 712 in FIG. 7, each Xn frontend announces the set of eNB IDs and/or Cell IDs that may be supported for cell-based or user-based procedures. Based on this, an Xn frontend may choose which particular Xn peer frontend to communicate with for cell-based or user-based procedures related to a given target eNB ID/cell ID.

Figure 9:
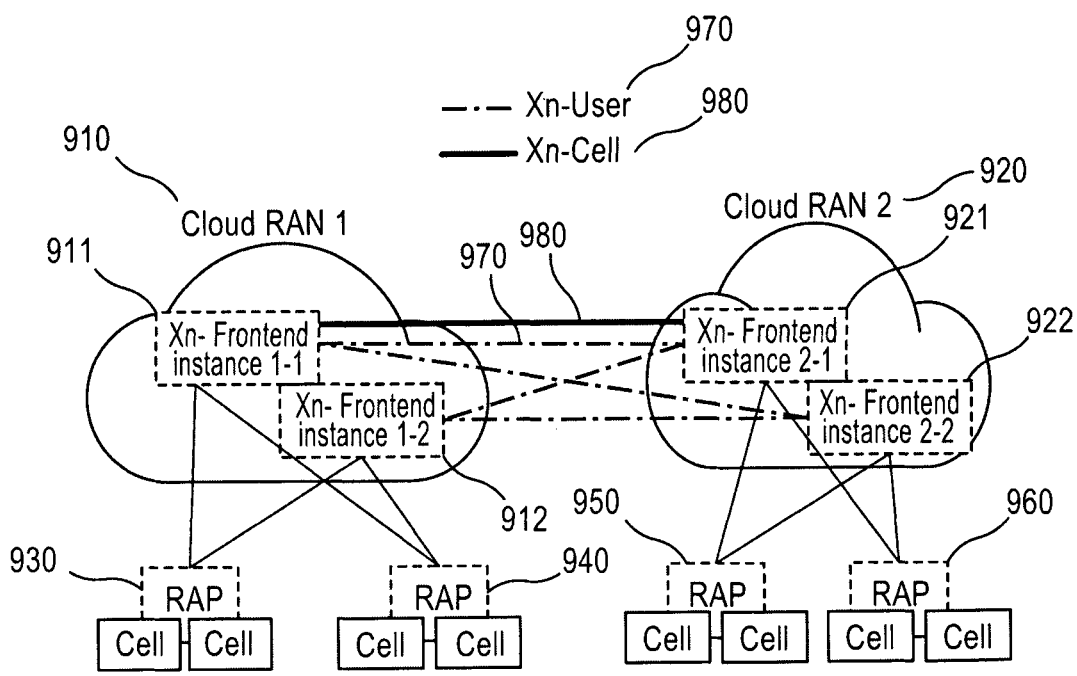
FIG. 9 illustrates an example of a system according to certain embodiments.

FIG. 9 illustrates a system according to certain embodiments. In particular, FIG. 9 illustrates a first cloud RAN 910 including a frontend instance 911 and a frontend instance 912, while a second cloud RAN 920 includes a frontend instance 921 and a frontend instance 922. Frontend instances 911 and 912 may be associated with first radio access points 930 and 940, while frontend instances 921 and 922 may be associated with second radio access points 950 and 960. In other words, frontends 911 and 912 may support at least one of a first cell identification or a first base station identification, while the plurality of other frontends 921 and 922 may support at least one of a second cell identification or a second base station identification. Each frontend may handle Xn messaging for any radio access point and/or cell under the cloud RAN. Frontend 911 and frontend 921 may have a cell-based connection 980 between them. They can handle non-user equipment associated procedures between any pair of cells in first cloud RAN 910 and second cloud RAN 920.

All of the Xn frontend instances in FIG. 9 may also be capable of handling user-based messaging. In other words, there may be user-based connections 970 between each of the frontend instances in first cloud RAN 910 and each of the frontend instances in second cloud RAN 920. Therefore, user-associated signaling between a cell under the first cloud RAN 910 and a cell under the second cloud RAN 920 may be transmitted over any of the user-based connections 970. A load balancing procedure may be used to determine on which of the multiple user-based connections 970 the user-associated signaling may be transmitted.

Figure 10:
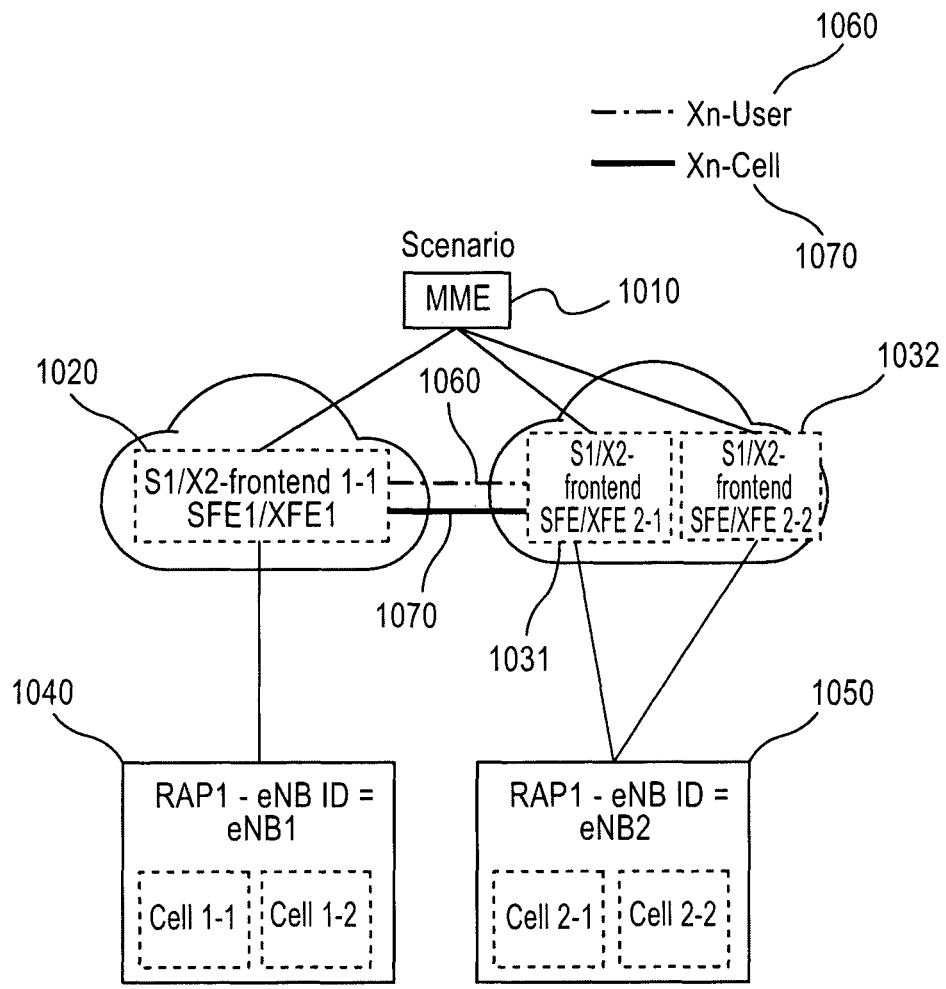
FIG. 10 illustrates an example of a system according to certain embodiments.

FIG. 10 illustrates a system according to certain embodiments. In particular, FIG. 10 may illustrate an MME 1010 connected to S1/X2 frontends 1020, 1031, and 1032 via an S1 interface. Frontend 1020 may be located in a different cloud RAN than frontends 1031 and 1032. In other words, frontend 1020 may support at least one of a first cell identification or a first base station identification, while the plurality of other frontends 1031 and 1032 may support at least one of a second cell identification or a second base station identification. Frontend 1020 may be connected to S1/X2 frontend 1031 through a user-based connection 1060 and a cell-based connection 1070. In some embodiments, connections 1060 and 1070 may be sub-connections that are a part of a single Xn connection between frontend 1020 and S1/X2 frontend 1031. The cloud RAN in which frontend 1020 is located may be associated with radio access point 1040, while frontends 1031 and 1032 are associated with radio access point 1050.

Figure 11:
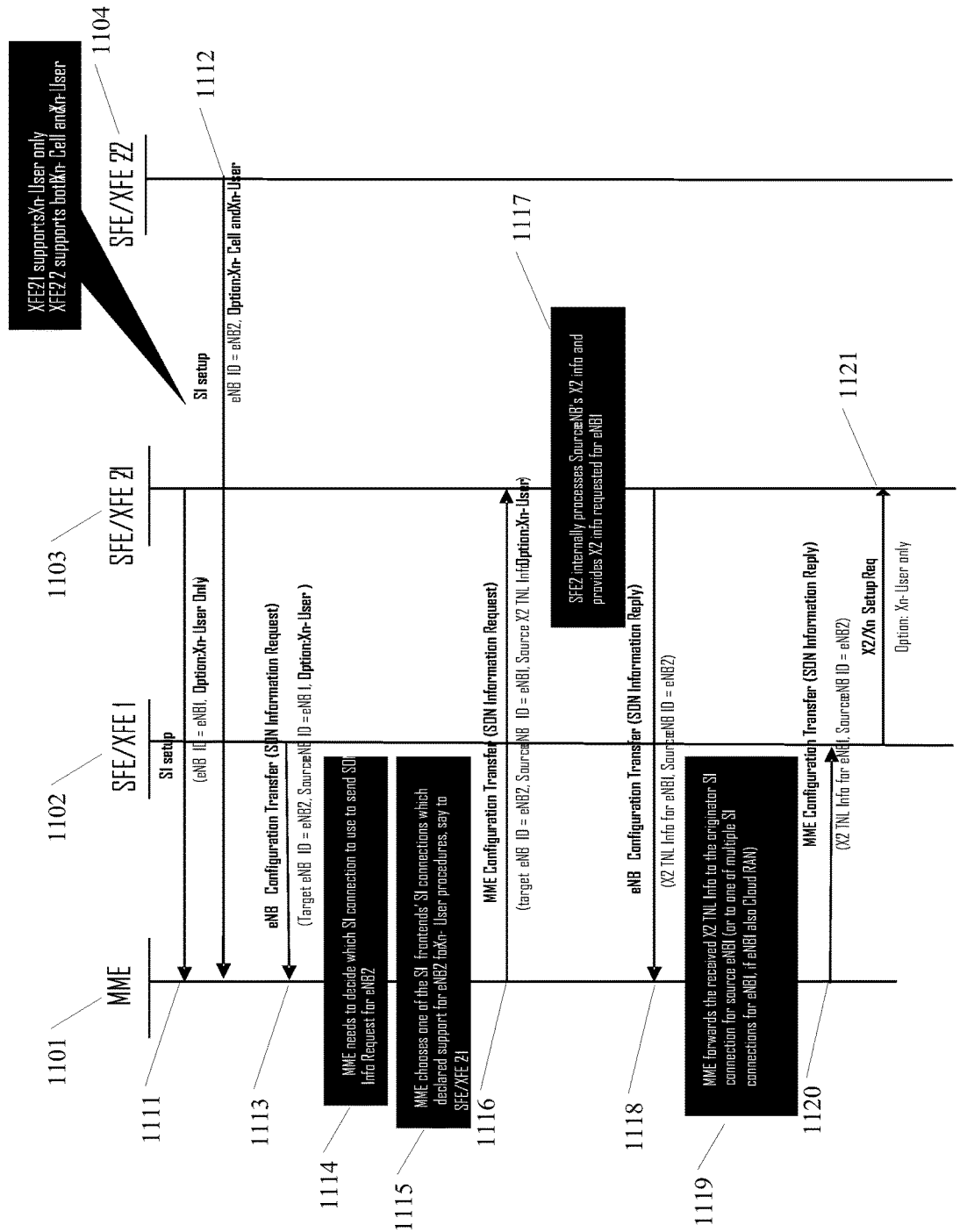
FIG. 11 illustrates an example of a signal flow diagram according to certain embodiments.

FIG. 11 illustrates a signal flow diagram according to certain embodiments. In particular, FIG. 11 illustrates an enhancement for an SON ANR procedure for establishing a user-based connection or a cell-based connection. Each frontend instance may be capable of serving as both an Xn frontend and/or an S1 frontend. In other words, the S1 frontend may be configured to also be an Xn frontend for some at of one or more Cell IDs and/or eNB IDs. In 5G, instead of S1, the interface may be an N2 connection. In some embodiments, the user-based connection and the cell-based connection may be decoupled, and may each be connected to separate frontends.

The system in FIG. 11 illustrates an MME 1101, a first frontend 1102, a second frontend 1103, and a third frontend 1104. In step 1111, MME 1101 may receive an S1 setup from second frontend 1103, including an eNB ID 1 and/or an indication that the frontend supports only a user-based connection, without providing support for a cell-based connection. In step 122, MME 1101 may receive an S1 setup from third frontend 1104, including an eNB ID 2 and an indication that the frontend supports both one or more user-based connections and/or one or more cell-based connections.

When first frontend 1102, for a given source Cell ID or an eNB ID, initiates a cell-based connection or a user-based connection with a target cell ID or eNB ID, in step 1113, MME 1101 may receive a configuration transfer or an SON information request from first frontend 1102. The configuration transfer message in general may indicate that it is requesting Xn connection information for a cell-based and/or user-based connection, and the embodiment in 1113 shows that a user-based Xn connection is being requested. The frontend may further indicate that MME 1101 may check one or more/all of the S1 connections. This may allow MME 1101 to identify multiple suitable Xn connections for the same target Cell ID and/or eNB ID. In step 1114, the MME may decide which S1 connection may be used to send an SON information request for eNB2. In general, the MME may also choose an S1 connection based on whether the frontend in the S1 setup has indicated support for user-based and/or cell-based connections. Since step 1113 requested a user-based Xn connection, the MME may choose one or more S1 connections towards frontends which indicated that they support user-based connections. Thus in step 1115, MME may choose one of the S1 frontend connections that have declared support for just user-based connections, or S1 frontend connections which have declared support for user-based and cell-based connections associated with eNB2. In this embodiment, the MME may choose the S1 connection towards frontend 1103.

In step 1116, MME 1101 may transmit the MME configuration transfer or SON information request to second frontend 1103. The MME configuration transfer and/or SON information request may include a target eNB ID, a source eNB ID, and/or an indication for the type of Xn connection requested, in this case a user-based connection. In other words, the configuration transfer message may indicate that is requesting an Xn connection information for just cell-based connection and/or user-based connections. In step 1117, second frontend 1103 may internally process the source eNB X2 information and/or provide X2 information request for eNB1. Second frontend 1103 may transmit the eNB configuration transfer/SON information reply to MME 1101, in step 1118. The eNB configuration transfer/SON information reply may include an internet protocol information that should be provided to the requested for user-based and/or cell-based connection setup, for example X2 TNL information. In step 1119, MME 1101 may forward the received X2 TNL information for eNB2 to the originator S1 connection, which supported eNB1, or to one of the multiple S1 connections for eNB1, if eNB1 is also a cloud RAN. In step 1120, MME 1101 may transmit an MME configuration transfer/SON information reply to first frontend 1102.

First frontend 1102 may then transmit an X2/Xn setup request message for one or more user-based or cell-based connections to second frontend 1103, as shown in step 1121. In some other embodiments, second frontend 1103 may redirect the user-based or cell-based connection setup request to another frontend. For example, redirection may occur for load-balancing purposes or if the assignment of the cells has been changed.

Figure 12:
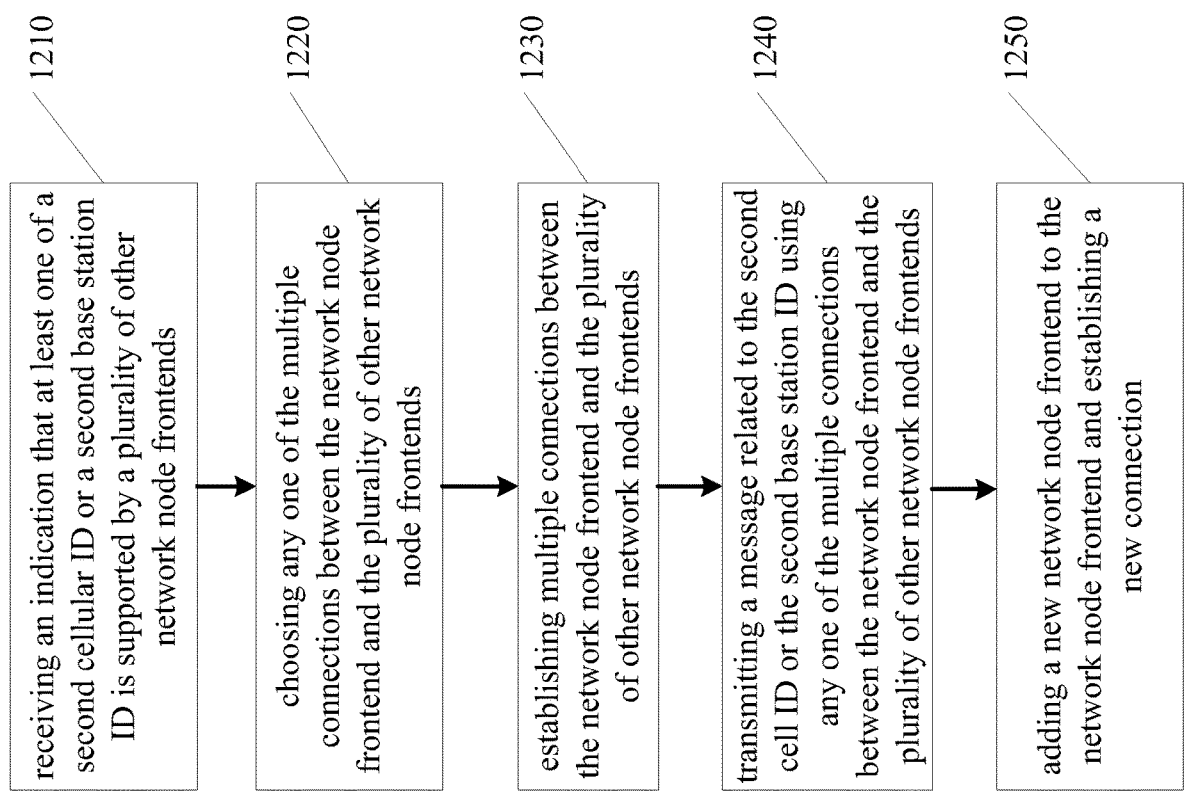
FIG. 12 illustrates an example of a method flow diagram according to certain embodiments.

FIG. 12 illustrates a method flow diagram according to certain embodiments. In step 1210, a network node frontend, which supports at least one of a first cell identification or a first base station identification, may receive an indication that at least one of a second cell identification or a second base station identification is supported by a plurality of other network node frontends. The network node frontend and the plurality other network node frontends may be located in a cloud radio access network. The indication that at least one of the cell identification or the base station identification is supported may be received from a network entity, for example a mobility management entity. The network node frontend may be one of a plurality of network node frontends. In step 1220, the network node frontend, which supports at least one of the first cell identification or the first base station identification, may choose any one of the multiple connections between the network node frontend and the plurality of other network node frontends, which supports at least one of the second cell identification or the second base station identification, for the transmitting of the message. The network node frontend and the plurality of other network node frontends may be associated with a different cell identification or a network node identification.

In step 1230, the network node frontend, which supports at least one of a first cell identification or a first base station identification, may establish multiple connections between the network node frontend and the plurality of other network node frontends in which at least one of the second cell identification or the second base station identification is supported. The establishing of the multiple connections may include using an extension of a SON ANR procedure. The multiple connections may be X2 or Xn interface connections. In step 1240, a message related to the second cell information or the second base station identification may be transmitted using any one of the multiple connections between the network node frontend and the plurality of other network node frontends. In step 1250, an additional network node frontend may be created, and an additional connection between the additional network node frontend and any of the plurality of other network node frontends may be established. The multiple connections may be at least one of a user-based connection or a cell-based connection.

Figure 13:
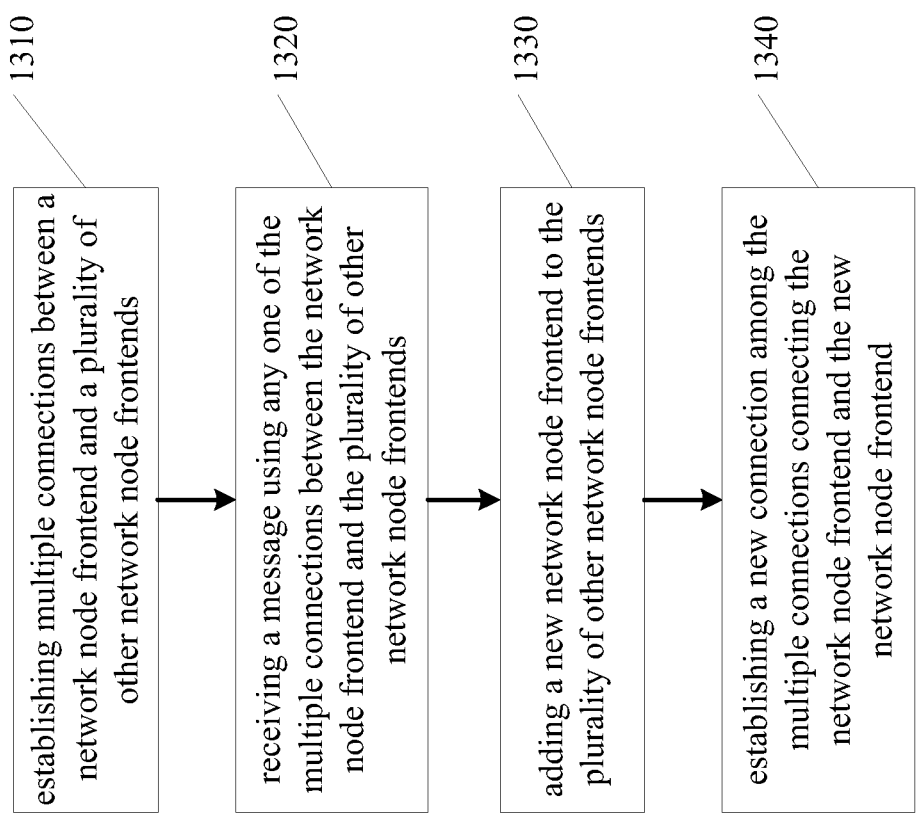
FIG. 13 illustrates an example of a method flow diagram according to certain embodiments.

FIG. 13 illustrates a method flow diagram according to certain embodiments. Certain embodiments may establish multiple connections between a network node frontend, which supports at least one of a first cellular identification or a first base station, and a plurality of other network node frontends in which a second cell identification or a second base station identification is supported, as shown in step 1310. In step 1320, the other network node may receive a message related to the second cell identification or the second base station identification using any one of the multiple connections between the network node frontend and the plurality of other network nodes. In step 1330, a new network node frontend, which supports at least one of a second cell identification and a second base station identification, may be added to the plurality of other network node frontends. In step 1340, a new connection may be established among the multiple connections connecting the network node frontend and the new network node frontend.

Figure 14:
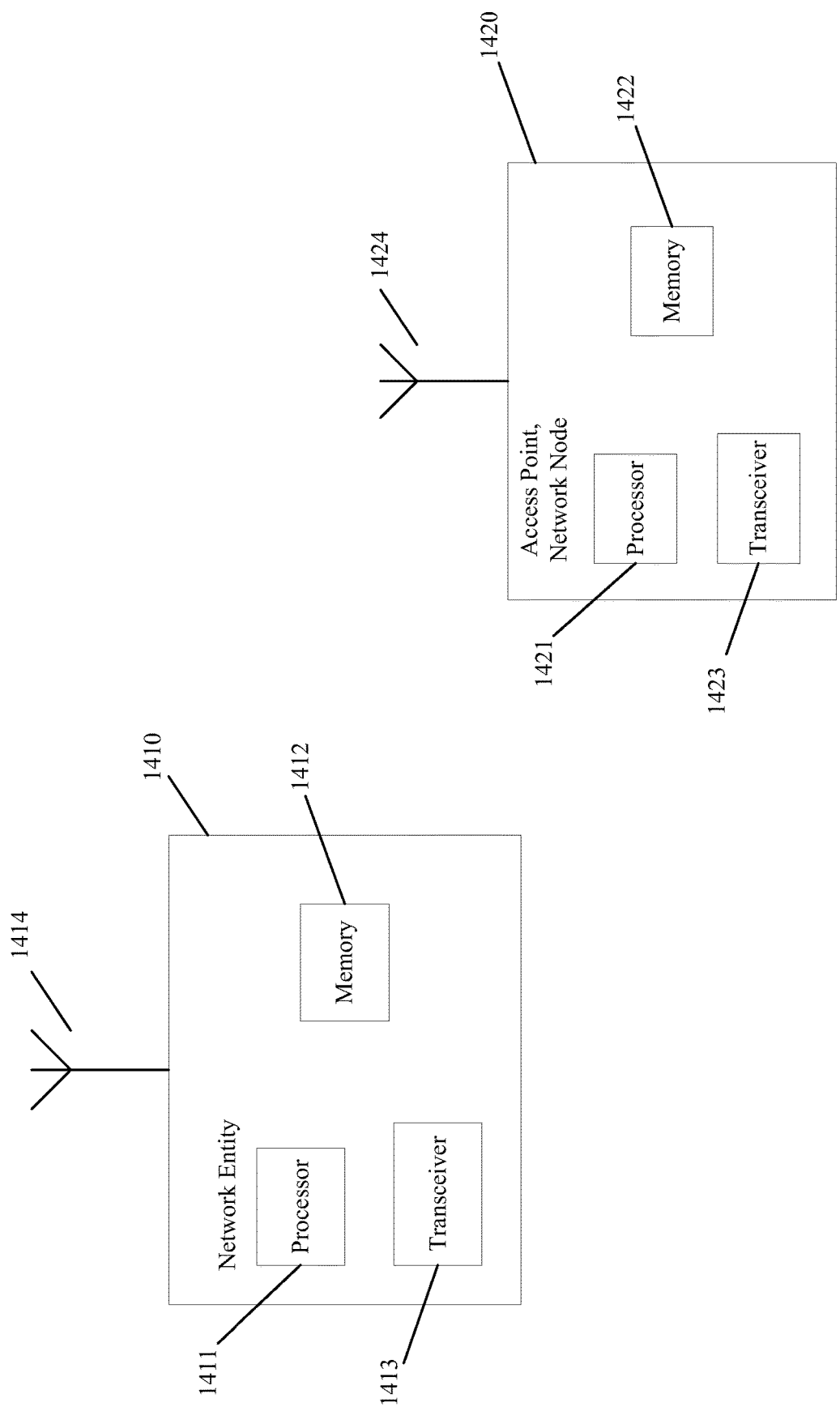
FIG. 14 illustrates an example of a system according to certain embodiments.

FIG. 14 illustrates a system according to certain embodiments. It should be understood that each signal or block in FIGS. 1-13 may be implemented by various means or their combinations, such as hardware, software, firmware, one or more processors and/or circuitry. In one embodiment, a system may include several devices, such as, for example, network entity 1410 or network node or access point 1420. The system may include a user equipment and a cloud RAN, which may include at least one front end and other RAN functions. The system may include more than one network node or access point 1420 and more than one network entity 1410, although only one access node shown for the purposes of illustration. The network entity 1410 may be a MME or an MME equivalent in 5G. The network node or access point 1420 may be a base station, an access node, a 5G NB or 5G BTS, a server, a host, or any of the other access or network node discussed herein.

Each of these devices may include at least one processor or control unit or module, respectively indicated as 1411 and 1421. At least one memory may be provided in each device, and indicated as 1412 and 1422, respectively. The memory may include computer program instructions or computer code contained therein. One or more transceiver 1413 and 1423 may be provided, and each device may also include an antenna, respectively illustrated as 1414 and 1424. Although only one antenna each is shown, many antennas and multiple antenna elements may be provided to each of the devices. Other configurations of these devices, for example, may be provided. For example, network entity 1410 and network node or access point 1420 may be additionally configured for wired communication, in addition to wireless communication, and in such a case antennas 1414 and 1424 may illustrate any form of communication hardware, without being limited to merely an antenna.

Transceivers 1413 and 1423 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner In other words, division of labor may vary case by case. One possible use is to make a network node deliver local content. One or more functionalities may also be implemented as virtual application(s) in software that can run on a server.

As discussed above, the network node and/or access point 1420 may communicate with a user equipment or a user device. The user equipment may include at least a processor, memory, transceiver, or any hardware and/or software described herein. The user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, an apparatus, such as a network entity or a network node, may include means for carrying out embodiments described above in relation to FIGS. 1-13. In certain embodiments, at least one memory including computer program code can be configured to, with the at least one processor, cause the apparatus at least to perform any of the processes described herein.

Processors 1411 and 1421 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 1412 and 1422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 1410 or network node or access point 1420, to perform any of the processes described above (see, for example, FIGS. 1-13). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 14 illustrates a system including a network entity 1410 and access point or network node 1420, certain embodiments may be applicable to other configurations, and configurations involving additional elements, as illustrated and discussed herein. For example, multiple access points and multiple network entities may be present, or other nodes providing similar functionality, such as nodes that combine the functionality of a user equipment and a network entity, such as a relay node. The access point or network node may likewise be provided with a variety of configurations for communication other than communication network entity 1410. The cloud RAN, and the frontends and other RAN functions provided within the cloud RAN, may be operated on a server or a host that may include a processor, memory, transceiver, or any hardware and/or software described herein.

The above embodiments provide for significant improvements to the functioning of a network and/or to the functioning of the network entities, access points, or network nodes within the network, as well as UEs communicating with the network. Certain embodiments provide for multiple connections between one or more frontends in a network node and a plurality of frontends in the other network node. The flexibility created by the use of multiple connections and the plurality of frontends may improve the scalability, load-balancing, and/or pooling of the network.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. The above embodiments may be applied in LTE, LTE-A, 5G technology, or any other mobile network or wireless system.

PARTIAL GLOSSARY

3GPP Third Generation Partnership Project
LTE Long Term Evolution
LTE-A LTE Advanced
eNBs Evolved NodeBs
5G 5th Generation
NR New Radio
gNB 5G Network Node
UE User Equipment
RAN Radio Access Network
XFE Xn-Frontend Instance
BTS Base Transceiver Station
MME Mobility Management Entity
SON Self-Organizing Network
ANR Automatic Neighbor Relation
S-GW Serving Gateway
SFE S1 Frontend
SCTP Stream Control Transmission Protocol

I claim:

1. A method, comprising:
receiving, at a network node frontend instance located in a cloud radio access network, which supports at least one of a first cell identification or a first base station identification, an indication that at least one of a second cell identification or a second base station identification is supported by a plurality of other network node frontend instances located in a cloud radio access network;
establishing an Xn or X2 logical interface, the logical interface including multiple connections between the network node frontend instance, which supports at least one of a first cell identification or a first base station identification, and the plurality of other network node frontend instances in which at least one of the second cell identification or the second base station identification is supported; and
transmitting a message related to the second cell identification or the second base station identification using any one of the multiple connections between the network node frontend instance and the plurality of other network node frontend instances.

2. The method according to claim 1, further comprising:
choosing any one of the multiple connections between the network node frontend instance and the plurality of other network node frontend instances for the transmitting of the message.

3. The method according to claim 1, wherein the multiple connections are X2 or Xn interface connections.

4. The method according to claim 1, wherein the receiving of the indication and the establishing of the multiple connections comprises:
transmitting a request to a network entity comprising another indication of a target cell or base station that corresponds to the second cell identification or the second base station identification;
receiving the indication from the network entity comprising information about at least one of the plurality of other network node frontend instances that support the second cell identification or the second base station identification; and
establishing at least one of the multiple connections to at least one of the plurality of other network node frontend instances using the information received from the network entity.

5. The method according to claim 1, further comprising:
adding a new network node frontend instance to the network node frontend instance; and
establishing a new connection among the multiple connections connecting the network node frontend instance and the new network node frontend instance.

6. The method according to claim 1, wherein the network node frontend instance is one of a plurality of network node frontend instances.

7. The method according to claim 1, wherein the network frontend instance and the plurality of other network frontend instances also serve as S1 interface terminals.

8. The method according to claim 1, wherein the multiple connections are at least one of a user-based connection or a cell-based connection.

9. The method according to claim 1, wherein the indication that at least one of the second cell identification or the second base station identification is supported is received from a mobility management entity.

10. The method according to claim 1, further comprising:
transmitting a connection setup request from the network node frontend instance to at least one of the plurality of the other network node frontend instances based on the received second cell identification and the second base station identification.

11. The method according to claim 1, wherein the network node frontend instance is associated with a cell or a radio access point and the plurality of the other network node frontend instances are associated with a different cell or a different radio access point.

12. A method, comprising:
establishing an Xn or X2 logical interface, the logical interface including multiple connections between a network node frontend instance, which supports at least one of a first cellular identification or a first base station, and a plurality of other network node frontend instances in which a second cell identification or a second base station identification is supported; and
receiving a message related to the second cell identification or the second base station identification using any one of the multiple connections between the network node frontend instance and the plurality of other network node frontend instances.

13. The method according to claim 12, wherein the multiple connections are X2 or Xn interface connections.

14. The method according to claim 12, further comprising:
adding a new network node frontend instance to the plurality of other network node frontend instances; and
establishing a new connection among the multiple connections connecting the network node frontend instance and the new network node frontend instance.

15. The method according to claim 12, wherein the multiple connections are at least one of a user-based connection or a cell-based connection.

16. The method according to claim 12, further comprising:
receiving a connection setup request at at least one of the plurality of the other network node frontend instances based on the second cell identification and second base station identification.

17. The method according to claim 12, wherein the establishing of the multiple connections comprises:
transmitting a request to a network entity comprising an indication of a target cell or base station that corresponds to the first cell identification or the first base station identification;
receiving another indication from the network entity comprising information about the network node frontend instance that support the first cell identification or the first base station identification; and
establishing at least one of the multiple connections to the network node frontend instance using the information received from the network entity.

18. The method according to claim 12, wherein the network frontend instance and the plurality of other network frontend instances also serve as S1 interface terminals.

19. An apparatus comprising:
at least one processor; and
at least one memory including computer program code,
wherein the at least one memory and the computer program code are configured to, with the at least one processor, cause the apparatus at least to perform a method, said method comprising:
receiving, at a network node frontend instance located in a cloud radio access network, which supports at least one of a first cell identification or a first base station identification, an indication that at least one of a second cell identification or a second base station identification is supported by a plurality of other network node frontend instances located in a cloud radio access network;
establishing an Xn or X2 logical interface, the logical interface including multiple connections between the network node frontend instance, which supports at least one of a first cell identification or a first base station identification, and the plurality of other network node frontend instances in which at least one of the second cell identification or the second base station identification is supported; and
transmitting a message related to the second cell identification or the second base station identification using any one of the multiple connections between the network node frontend instance and the plurality of other network node frontend instances.

20. A computer program product embodied on a non-transitory computer-readable medium and encoding instructions that, when executed in hardware, perform a process, the process including the method according to claim 1.

21. An apparatus comprising:
at least one processor; and
at least one memory including computer program code,
wherein the at least one memory and the computer program code are configured to, with the at least one processor, cause the apparatus at least to perform a process, the process including the method according to claim 12.

* * * * *